(12) United States Patent
Hataida et al.

(10) Patent No.: US 7,783,840 B2
(45) Date of Patent: Aug. 24, 2010

(54) METHOD AND APPARATUS FOR CONTROLLING MEMORY SYSTEM

(75) Inventors: Makoto Hataida, Kawasaki (JP); Takao Matsui, Kawasaki (JP); Daisuke Itoh, Kawasaki (JP); Seishi Okada, Kawasaki (JP); Takaharu Ishizuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/999,972

(22) Filed: Dec. 1, 2004

(65) Prior Publication Data

US 2006/0031641 A1 Feb. 9, 2006

(30) Foreign Application Priority Data

Aug. 5, 2004 (JP) .............................. 2004-229082

(51) Int. Cl.
  *G06F 12/00* (2006.01)
  *G06F 13/00* (2006.01)
  *G06F 13/28* (2006.01)

(52) U.S. Cl. .................. 711/144; 711/130; 711/141; 711/145; 711/146

(58) Field of Classification Search ................ 711/130, 711/141, 144, 145, 146
See application file for complete search history.

(56) References Cited

U.S. PATENT DOCUMENTS

| | | | | |
|---|---|---|---|---|
| 5,829,032 A * | 10/1998 | Komuro et al. | ............. | 711/141 |
| 6,092,172 A | 7/2000 | Nishimoto et al. | | |
| 6,526,480 B1 | 2/2003 | Naruse et al. | | |
| 6,532,528 B1 | 3/2003 | Nishimoto et al. | | |
| 6,721,856 B1 * | 4/2004 | Arimilli et al. | ............. | 711/146 |
| 6,918,009 B1 * | 7/2005 | Sato et al. | ................... | 711/137 |
| 2002/0087811 A1 | 7/2002 | Khare et al. | | |
| 2003/0009638 A1 * | 1/2003 | Sharma et al. | ............. | 711/145 |
| 2003/0097530 A1 * | 5/2003 | Arimilli et al. | ............. | 711/146 |
| 2004/0215899 A1 * | 10/2004 | Arimilli et al. | ............. | 711/146 |

FOREIGN PATENT DOCUMENTS

| | | |
|---|---|---|
| EP | 0 735 484 | 10/1996 |
| JP | 8-185359 | 7/1996 |
| JP | 2002-24198 | 1/2002 |

(Continued)

OTHER PUBLICATIONS

Jim Handy, The Cache Memory Book, 1998, Academic Press, second edition, pp. 138-172.*

(Continued)

*Primary Examiner*—Matt Kim
*Assistant Examiner*—Michael Alsip
(74) *Attorney, Agent, or Firm*—Staas & Halsey LLP

(57) ABSTRACT

A cache-status maintaining unit stores address information of data stored in each entry of a cache memory, and maintains a status of each entry as any one of "strongly modified", "weakly modified", "shared", and "Invalid". A data-fetching-procedure selecting unit selects, upon receiving a data read request, at least one data fetching procedure based on the address information and the status. A read-data delivering unit selects latest data from among the data fetched, and delivers the latest data to a processor that issued the data read request. A cache-status updating unit updates, when registering the address information of the data, updates the status of the entry based on a type of the data read request.

18 Claims, 7 Drawing Sheets

| CACHE MEMORY | M | E | S | I | |
|---|---|---|---|---|---|
| SNOOP CACHE | M | W | S | I | W |

FOREIGN PATENT DOCUMENTS

| | | |
|---|---|---|
| KR | 1998-032776 | 7/1998 |
| KR | 1998-576310 | 9/1998 |
| WO | WO00/34882 | 6/2000 |
| WO | WO00/38077 | 6/2000 |

OTHER PUBLICATIONS

Kontothanassis L I, et al., "Lazy Release Consistency for Hardware-Coherent Multiprocessors" Supercomputing, 1995. Proceeding of the IEEE/ACM SC95 Conference San Diego, CA USA Dec. 3-6, 1995, Piscataway, NJ, USA, IEEE, Dec. 3, 1995, XP010769762, ISBN: 0-89791-816-9, 37 pages.

European International Search Report mailed Apr. 17, 2008, (co-pending European Application No. EP 04 25 7577).

KR 1998-32776A is Equivalent to USP 6,092,172 and UPS 6,532,528.

KR 1998-57631A is Equivalent to KR 100433511B1.

* cited by examiner

FIG.1

| CACHE MEMORY | M | E | S | I | |
|---|---|---|---|---|---|
| SNOOP CACHE | M | W | S | I | W |

FIG.7A
Related Art

| CACHE MEMORY | M | E | S | I |
|---|---|---|---|---|
| SNOOP CACHE | M | E | S | I |

FIG.7B
Related Art

| CACHE MEMORY | M | E | S | I | |
|---|---|---|---|---|---|
| SNOOP CACHE | M | | S | I | M |

METHOD AND APPARATUS FOR CONTROLLING MEMORY SYSTEM

BACKGROUND OF THE INVENTION

1) Field of the Invention

The present invention relates to a technology for controlling coherency between a cache memory and a main memory in a multiprocessor system having an independent cache memory for each of a plurality of processors, by which a transaction between the cache memory and the main memory can be reduced and performance degradation of the multiprocessor system can be prevented.

2) Description of the Related Art

There are multiprocessor systems in which an independent cache is provided for each processor. In such multiprocessor systems the cache may be an integral part of the processor. Methods such as MESI protocol, speculative read, snoop cache, etc. have been conventionally employed in multiprocessor systems to effectively ensure coherency and thus enhance the performance.

The MESI protocol is a type of cache coherency protocol in which the memory system is managed by categorizing each line of the cache into one of the four statuses, namely, "Modified", "Exclusive", "Shared", and "Invalid". The MESI protocol unambiguously identifies the location of latest data, thus effectively ensuring coherency between each cache and the main memory (see, for example, Japanese Patent Laid-Open Publication No. 2002-24198).

In the speculative read method, the processor is queried and simultaneously a read request to read the main memory is also made. When a processor requests for data, each of the processors has to be queried for the requested data. This is done to ensure coherency of data. The read request to read the main memory is carried out only after a response is received from the processor. This results in significant latency (delay).

Therefore, by issuing a query to a processor and simultaneously issuing a speculative read request to read the main memory, the data speculatively read from the main memory is transmitted to the processor that made the read request, if the response for the processor suggests that the requested data is not available. Thus, the latency in fetching the data can be reduced by employing the speculative read method.

However, if a speculative read request is issued for every read request, the transaction between the cache and the main memory will go up significantly, resulting in degradation of the system performance. Therefore, a method that employs a snoop cache is adopted. In this method, a snoop cache is provided as an integral part of a memory system control apparatus which controls memory access. The snoop cache stores information pertaining to the lines of each cache memory.

The memory system control apparatus refers to the status of the snoop cache to gauge the status of each line of the cache of each processor without having to query the processors, thereby dispensing with speculative read requests (see, for example, Japanese Patent Laid-Open Publication No. H8-185359).

However, depending on the specification of the bus that connects the processors, the memory system control apparatus may not accurately gauge the transitions in the status of the cache of the processors. Referring to the snoop cache does not give the accurate status of the cache. This necessitates querying the processors.

To avoid increasing the latency in obtaining response from the processors, it becomes necessary to use speculative read request to read the main memory. However, since many speculative read requests are issued, the transaction between the cache and the main memory goes up significantly, thereby adversely affecting the system performance.

SUMMARY OF THE INVENTION

It is an object of the present invention to solve at least the above problems in the conventional technology.

A memory system control apparatus, according to one aspect of the present invention, which controls coherency between a cache memory provided for each of a plurality of processors of a multiprocessor system and a main memory, includes a cache-status maintaining unit that stores address information of data stored in each entry of the cache memory, and maintains a utilization status of each entry as any one of "strongly modified", "weakly modified", "shared", and "Invalid"; a data-fetching-procedure selecting unit that selects, upon receiving a data read request from one of the processors, at least one data fetching procedure based on the address information and the utilization status maintained by the cache-status maintaining unit; a read-data delivering unit that selects latest data from among the data fetched by the fetching procedure selected by the data-fetching-procedure selecting unit, and delivers the latest data selected to a processor that issued the data read request; and a cache-status updating unit that updates, when registering the address information of the data in one of the entries of the cache-status maintaining unit corresponding to the processor that issued the data read request, updates the utilization status of the entry based on a type of the data read request.

A memory system control method according to another aspect of the present invention, which is for controlling coherency between a cache memory provided for each of a plurality of processors of a multiprocessor system and a main memory, includes a cache-status maintaining step of storing address information of data stored in each entry of the cache memory, and maintaining a utilization status of each entry as any one of "strongly modified", "weakly modified", "shared", and "Invalid"; a data-fetching-procedure selecting step of selecting, upon receiving a data read request from one of the processors, at least one data fetching procedure based on the address information and the utilization status maintained at the cache-status maintaining step; a read-data delivering step of selecting latest data from among the data fetched by the fetching procedure selected at the data-fetching-procedure selecting step, and delivering the latest data selected to a processor that issued the data read request; and a cache-status updating step of updating, when registering the address information of the data in one of the entries in the cache-status maintaining step corresponding to the processor that issued the data read request, updates the utilization status of the entry based on a type of the data read request.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 1 is a drawing of a memory system control method according to an embodiment of the present invention;

FIG. 7A is a drawing of the memory system control method according to an MESI protocol;

FIG. 7B is a drawing of the memory system control method according to an MSI protocol.

DETAILED DESCRIPTION

Figure 2:
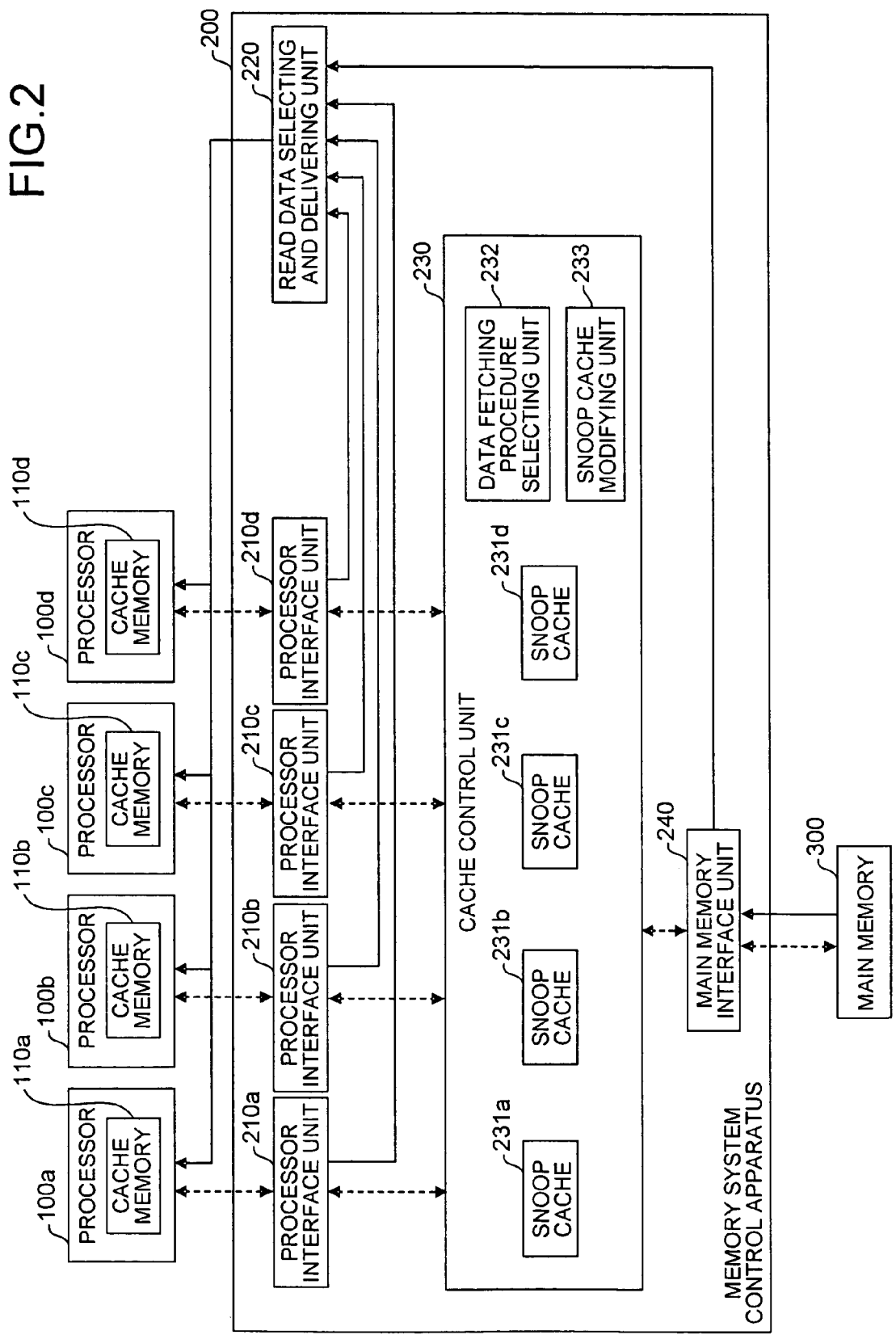
FIG. 2 is a block diagram of a memory system control apparatus according to the an embodiment of the present invention.

Exemplary embodiments of a method and an apparatus for controlling a memory system according to the present invention are explained with reference to the accompanying drawings. In the following description, the cache is assumed to be an integral part of each processor. Though the present invention assumes that each processor has its own cache, the cache need not necessarily be an integral part of each processor.

FIG. 7A is a drawing of the memory system control method according to the MESI protocol. The correspondence between the status management on the cache memory side and the status management on the snoop cache side in a multiprocessor system having a plurality of processors is shown in FIG. 7A.

A cache memory is a storage device that is provided between the processor and the main memory to speed up data exchange between the two. Each processor has its own separate cache memory in the example cited here.

A snoop cache is a storage device provided as an integral part of the memory system control apparatus that controls the data exchange between the processor and the main memory. There is a corresponding snoop cache for each cache memory. The snoop cache keeps tag information of each line of the corresponding cache memory.

As shown in FIG. 7A, each line stored in the cache memory is categorized as one of the four statuses, namely, "M (Modified)", "E (Exclusive)", "S (Shared)", and "I (Invalid)". Each line of the snoop cache that corresponds to the cache memory is also categorized as being in one of the four statuses.

Thus, when the status of the cache memory is always in agreement with the status of the snoop cache, the memory system control apparatus does not need to query the processor for the status of the cache memory and can determine the processor from which data is to be fetched by merely referring to the snoop cache of each processor.

To be specific, upon receiving a data read request from a processor, the memory system control apparatus refers to the snoop cache of each processor to look for the line that includes the requested data. If no line of the snoop caches has the requested data, the memory system control apparatus fetches from the main memory the line that includes the requested data. If a line that includes the requested data is present in one of the snoop caches, the memory system control apparatus verifies the status of the line and determines the processor from which the requested data is to be fetched.

If the status of the line is "M", it indicates that the line has been modified by the processor and is stored in the cache memory in a modified state. Consequently, the data needs to be fetched from the cache memory of the processor to which the line belongs.

If the status of the line is "E" it indicates that the line belongs to a single processor. If the status of the line is "S", it indicates that the line is shared by a plurality of processors. Consequently, the data may be fetched either from the cache memory of the processor to which the line belongs or from the main memory.

If the status of the line is "I", it indicates the line has invalid content, and therefore data has to be fetched from the cache memory of the processor other than the processor to which the line belongs or from the main memory.

Thus, when the status of the cache memory and the status of the snoop memory are in agreement, there is no load on the system and the system can effectively fetch the data.

FIG. 7B is a drawing of the memory system control method according to an MSI protocol. The status of the line in the cache memory of the processor changes from "E" to "M" to "I" according to the specification of the bus of the processor. The memory system control apparatus fails to gauge the changing status of the line.

In such cases, conventionally, the MSI protocol is employed instead of the MESI protocol on the snoop cache side. The status "M" and the status "E" are not differentiated in the MSI protocol.

In the example shown in FIG. 7B, the line with the status "E" on the cache memory side is managed as the line with the status "M" on the snoop cache side. Even when the status of the line changes to "M" or "I", the change is not detected on the memory system control apparatus side. Consequently, the status "M" on the snoop cache side remains unchanged. Therefore, the status "M" on the snoop cache side corresponds not only to the status "E" but also to the status "M" or "I" on the cache memory side.

In other words, the status "M" on the snoop cache side in this example indicates that there is as much possibility of the data in the cache memory being latest as there is the possibility of the data not being the latest, and thus does not unambiguously indicate that the data in the cache memory is the latest.

Consequently, when the line that includes the data requested by the processor is in the snoop cache and the status of the line is "M", the memory system control apparatus, queries the processor corresponding to the snoop cache pertaining the line. If the response received is no valid data is available, the memory system control apparatus has to issue another data request to the main memory.

Normally, a speculative read request to read the main memory is carried out simultaneously with issuing the query to the processor to reduce the latency arising out of requesting data from the main memory until after a response is received from the server. Though on the one hand speculative read requests reduce the latency arising from cache error, on the other hand they lead to increased transaction between the cache and the main memory.

Figure 8:
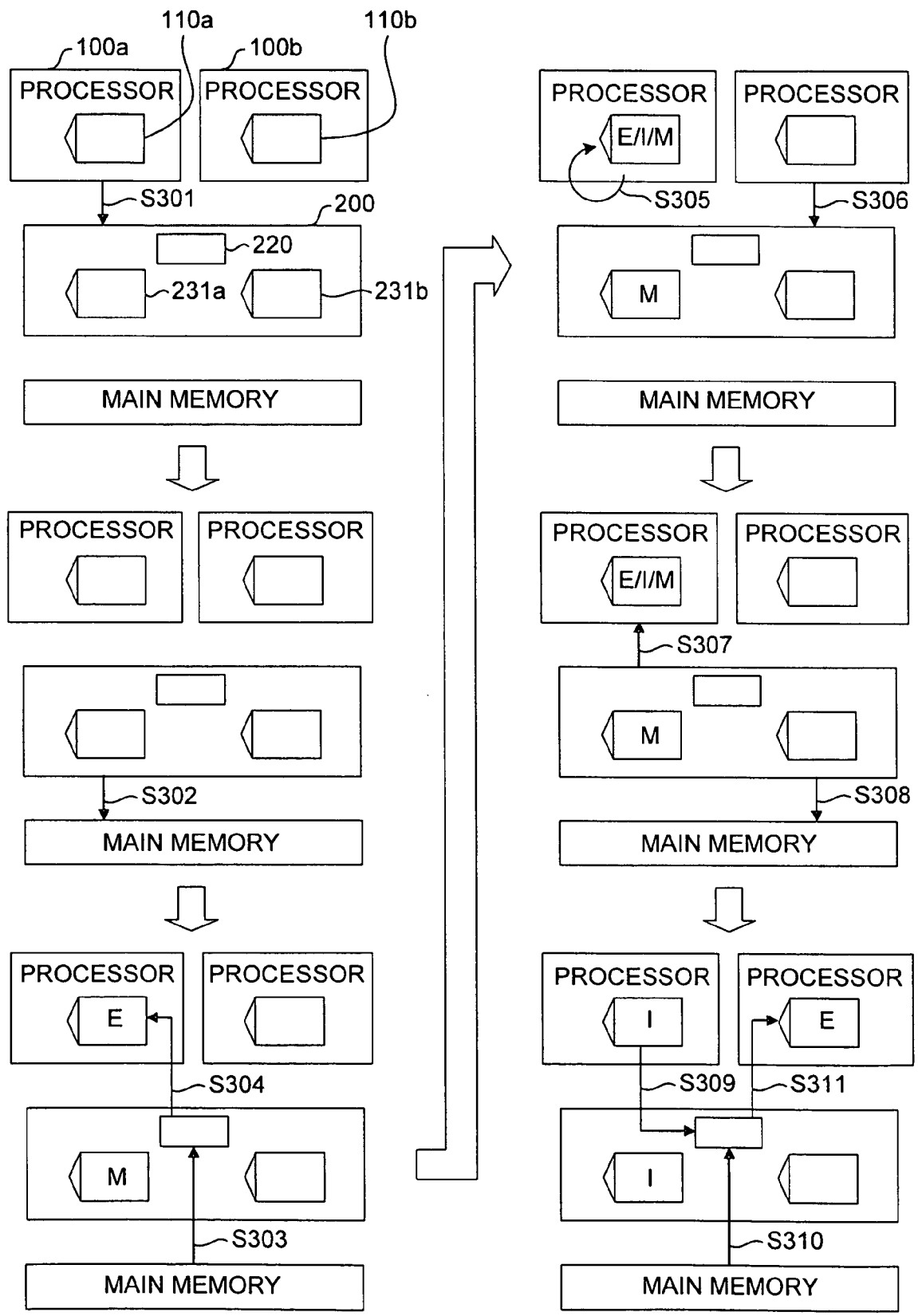
FIG. 8 is a drawing of the control procedure of the memory system control method according to the MSI protocol when the status is "Modified".

The generation of a speculative read request is explained next by citing an example. FIG. 8 is a drawing of a control procedure of the memory system control method according to the MSI protocol when the status is "Modified".

When a memory system control apparatus 200 receives from a processor 100a a read request for data not present in any of the caches (Step S301), it issues to a main memory 300 a read request to read the line that includes the data (Step S302).

The line read from the main memory 300 is sent to a read-data delivering unit 220 (Step S303). From the read-data delivering unit 220 the line is sent to the processor 100a that issued the request and is stored in the cache memory 110a (Step 304). At this point, the status of the line stored in the cache memory 110a changes to "E" and the status of the same line in a snoop cache 231a changes to "M".

Subsequently, even if the status of the line in the cache memory 110a changes to "M" when the line is updated by the processor 100a or to "I" when the line is discarded by the processor 100a, the memory system control apparatus 200 is unable to gauge the transition (Step S305).

If a processor 100b issues an exclusive read request for the data stored in the same line (Step S306), the memory system control apparatus 200 searches each of the snoop caches and verifies that the status of the line in the snoop cache 231a that corresponds to the processor 100a is "M".

Since the status "M" indicates that the data in the cache memory 110a is either the latest or invalid, the memory system control apparatus 200 queries the processor 100a pertaining to the line (Step S307).

Further, to avoid long latency in obtaining a response from the processor 100a, the memory system control apparatus 200 simultaneously issues to the main memory 300 a read request to read the line that includes the data (Step S308).

If a response is received from the processor 100a (Step S309), and if the requested line is sent by the main memory 300 (Step S310), the read-data delivering unit 220 determines the location of the latest data from the contents of the response from the processor 100a, selects the appropriate data, and delivers it to the processor 100b (Step S311).

At this point, the status of the line in the cache memory 110a and the snoop cache 231a changes to "I" while the status of the same line in the cache memory 110b changes to "E" and in the snoop cache 231b the status changes to "M".

Thus, in the conventional method in which the MSI protocol is employed instead of the MESI protocol on the snoop cache side, it becomes necessary to issue a speculative read request to the main memory, and the transaction between the cache and the main memory increases.

Figure 1:
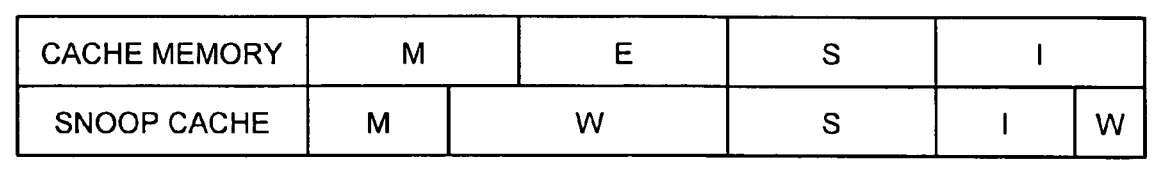

The memory system control method according to an embodiment of the present invention is explained next. FIG. 1 is a drawing of the memory system control method according to an embodiment of the present invention. In an embodiment of the present invention too the transition of the status of the line in the cache memory of the processor from "E" to "M" to "I" cannot be gauged by the memory system control apparatus.

As shown in FIG. 1, the status "M (Modified)" on the snoop cache side in the conventional method is differentiated into "M (Strongly modified)" and "W (Weakly modified)" in the memory system control method according to an embodiment of the present invention.

The status "M" in the memory system control method according to an embodiment of the present invention unambiguously indicates, like the status "M" in the conventional memory system control method according to the MESI protocol, that the data in the cache memory is the latest. The status "W" indicates, like the status "M" in the conventional memory system control method according to the MSI protocol, that the status of the data on the cache memory side is unknown.

If it is determined from the content of the request from the processor that the status of the line in the cache memory is "M", the memory system control apparatus sets the status of the same line in the snoop cache to "M". The memory system control apparatus sets the status of the line in the snoop cache to "M" if, for instance, the processor issues a data read request with a prerequisite that the data has already been written.

Since the line whose status is "M" in the snoop cache is guaranteed to be the latest in the cache memory, the need for issuing a speculative read request to the main memory is obviated. Thus, the load on the system can be reduced by that extent.

The structure of the memory system control apparatus according to an embodiment of the present invention is explained next. FIG. 2 is a block diagram of the memory system control apparatus according to an embodiment of the present invention. In FIG. 2, a memory system control apparatus 200 connects a plurality of processors 100a through 100d and a main memory 300. Any number of processors may be connected to the memory system control apparatus 200.

The processor 100a is an instruction execution unit that performs various operations and includes a cache memory 110a. The cache memory 110a has the capacity to store only a predetermined number of lines of the main memory 300, and stores the status of each of the lines as either "M" or "E" or "I".

The processors 100b, 100c, and 100d have a similar structure and hence are not described separately.

The memory system control apparatus 200 controls the exchange of data between the processors 100a through 100d and the main memory and ensures coherency. The memory system control apparatus 200 includes processor interface units 210a through 210d, a read-data delivering unit 220, a cache control unit 230, and a main memory interface unit 240.

The processor interface unit 210a is an input/output unit through which data exchange between the processor 100a and the memory system control apparatus 200 takes place. Similarly, the processor interface units 210b through 210d respectively carry out data exchange between the processors 100b through 100d and the memory system control apparatus 200.

The read-data delivering unit 220 delivers the data from the processors 100a through 100d and the main memory 300 to the processor that requested the data. When the memory system control apparatus 200 issues a speculative read request to the main memory 300 simultaneous with querying any one of the processors 100a through 100d, the read-data delivering unit 220 fetches two different information from the same line. However, the data selecting and delivering unit 220 determines the content of the response from the processor, and selects that data to be delivered to the processor that requested the data.

The cache control unit 230 controls the status of each line of the snoop cache and selects a data fetching procedure when there is a data request from the processors 100a through 100d. The cache control unit 230 includes snoop caches 231a through 231d, a data-fetching-procedure selecting unit 232, and a snoop cache updating unit 233.

The snoop cache 231a stores the tag information of each of the lines stored in a cache memory 110a and stores the status of each of the lines as either "M" or "W" or "S", or "I". The snoop caches 231b through 231d respectively store the tag information and the status of each of the lines stored in cache memories 110b through 110d.

The data-fetching-procedure selecting unit 232 selects, when there is a fetch request from the processors 100a through 100d to fetch data, a fetching procedure for fetching the line that includes the data. To be specific, the data-fetching-procedure selecting unit 232 checks whether the line that includes the data is available in the snoop caches 231a through 231d, and if the line is not available in the snoop caches 231a through 231d, fetches the line that includes the data from the main memory 300.

If the line that includes the data is available in the snoop caches 231a through 231d, the data-fetching-procedure selecting unit 232 verifies its status and selects the fetching procedure. If the status of the line is "M", the data-fetching-procedure selecting unit 232 fetches the line from the cache memory corresponding to the snoop cache. If the status of the line is "W", the data-fetching-procedure selecting unit 232 queries the processor corresponding to the snoop cache and simultaneously issues a speculative read request to the main memory 300.

If the status of the line is "S", the data-fetching-procedure selecting unit 232 fetches the line from the cache memory corresponding to the snoop cache. In this case, the data-fetching-procedure selecting unit 232 also may fetch the line from the main memory 300. If the status of the line is "I", the data-fetching-procedure selecting unit 232 fetches the line from the main memory 300.

The snoop cache updating unit 233 updates the status of each line of the snoop caches 231a through 231d based on the read request or notification of status update from the processors 100a through 100d. For instance, if the read request from the processors 100a through 100d is the type in which it is a prerequisite that data has already been written, the snoop cache updating unit 233 changes the status of the lines of the snoop caches 231b through 231d to "M".

The main memory interface unit 240 is an input/output unit through which data exchange between the main memory 300 and the memory system control apparatus 200 takes place. The main memory 300 deploys programs that are used by the multiprocessor system in which the memory sys tem control apparatus 200 is provided or the data used by these programs.

Figure 3:
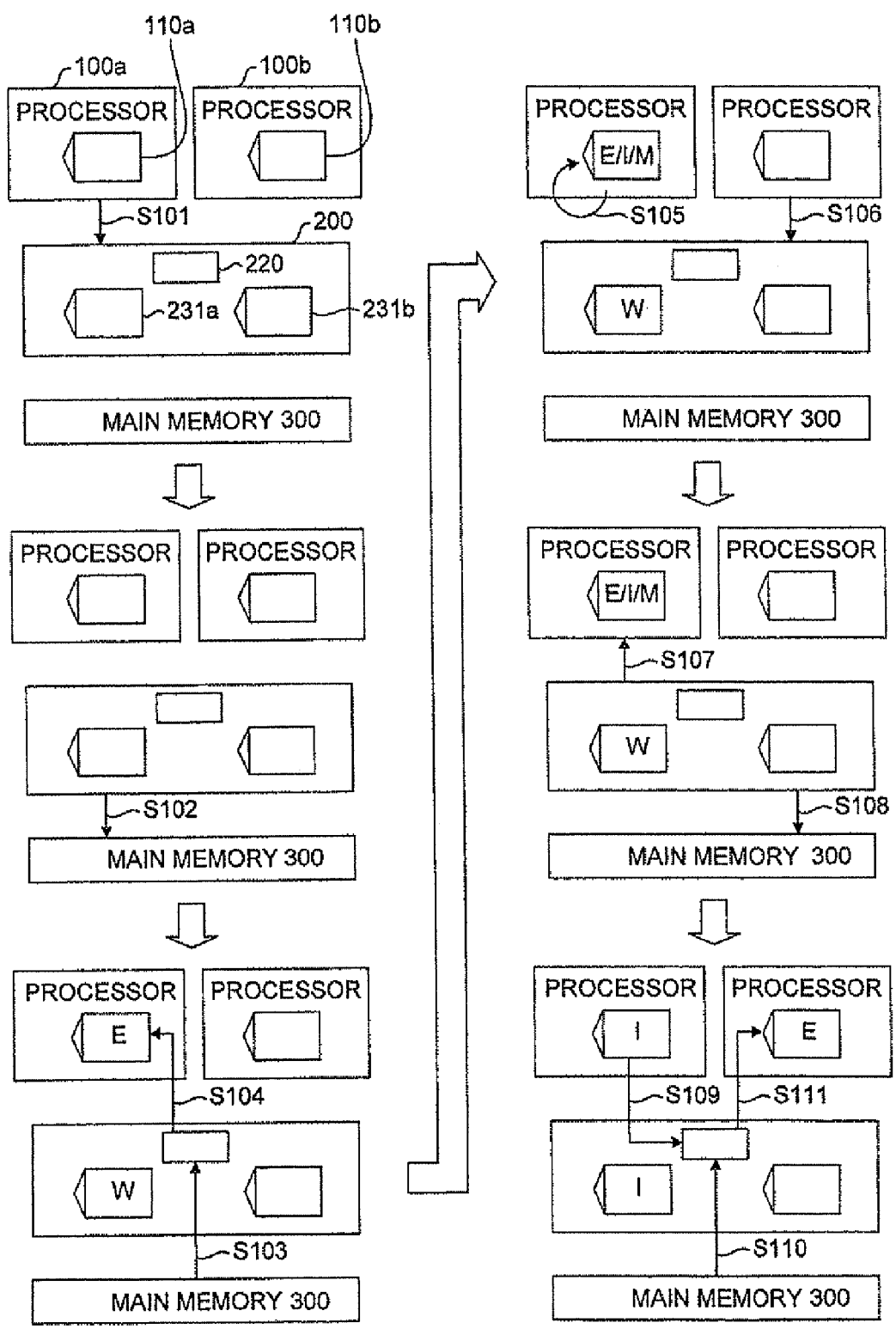
FIG. 3 is a drawing of a control procedure of the memory system control method according to an embodiment of the present invention when the status is "Weakly modified"

A control procedure in the memory system control method according to an embodiment of the present invention is explained next by citing an example. FIG. 3 is a drawing of the control procedure of the memory system control method according to an embodiment of the present invention when the status is "Weakly modified".

When the memory system control apparatus 200 receives from the processor 100a a read request of data not present in any of the caches (Step S101), it issues to the main memory 300 a read request to read the line that includes the data (Step S102).

The line read from the main memory 300 is sent to the read-data delivering unit 220 (Step S103). From the read-data delivering unit 220 the line is sent to the processor 100a that issued the request and is stored in the cache memory 110a (Step 104). At this point, the status of the line stored in the cache memory 110a changes to "E" and the status of the same line in the snoop cache 231a changes to "W".

Subsequently, even if the status of the line in the cache memory 110a changes to "M" when the line is updated by the processor 100a or to "I when the line is discarded by the processor 100a, the memory system control apparatus 200 is unable to gauge the transition (Step S105).

If the processor 100b issues an exclusive read request for the data stored in the same line (Step S106), the memory system control apparatus 200 searches each of the snoop caches and verifies that the status of the line in the snoop cache 231a that corresponds to the processor 100a is "W".

Since the status "W" indicates that the data in the cache memory 110a may be either the latest or invalid, the memory system control apparatus 200 queries the processor 100a pertaining to the line (Step S107).

Further, to avoid long latency in obtaining a response from the processor 100a, the memory system control apparatus 200 simultaneously issues to the main memory 300 a read request to read the line that includes the data (Step S108).

If a response is received from the processor 100a (Step S109), and if the requested line is sent by the main memory 300 (Step S110), the read-data delivering unit 220 determines the location of the latest data from the contents of the response from the processor 100a, selects the appropriate data, and delivers it to the processor 100b (Step S111).

At this point, the status of the line in the cache memory 110a and the snoop cache 231 a changes to "I" while the status of the same line in the cache memory 110b changes to "E" and in the snoop cache 231b the status changes to "W".

Thus, in the memory system control method according to an embodiment of the present invention also it becomes necessary issue a speculative read request to the main memory when the status on the snoop cache side is "Weakly modified", and therefore the transaction between the cache and the main memory increases.

Figure 4:
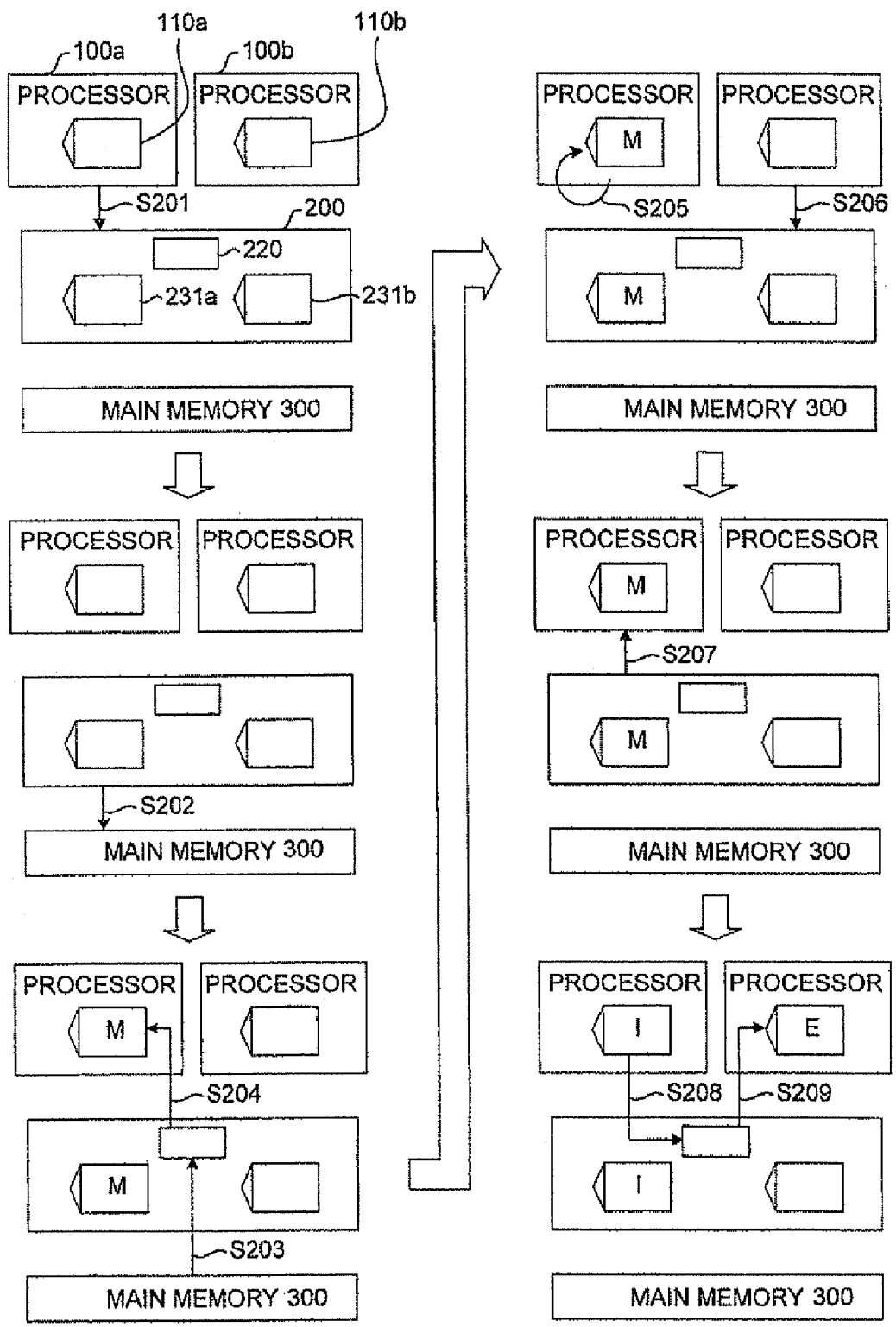
FIG. 4 is a drawing of the control procedure of the memory system control method according to an embodiment of the present invention when the status is "Strongly modified"

FIG. 4 is a drawing of the control procedure of the memory system control method according to an embodiment of the present invention when the status is "Strongly modified".

When the memory system control apparatus 200 receives from the processor 100a a read request of data not present in any of the caches (Step S201), it issues to the main memory 300 a read request to read the line that includes the data (Step S202).

The line read from the main memory 300 is sent to the read-data delivering unit 220 (Step S203). From the read-data delivering unit 220 the line is sent to the processor 100a that issued the request and is stored in the cache memory 110a (Step 204). At this point, the status of the line stored in the cache memory 110a changes to "M" and the status of the same line in the snoop cache 231a also changes to "M".

Subsequently, even if the line is updated by the processor 100a, the status in the cache memory 110a remains "M" (Step S205).

If the processor 100b issues an exclusive read request for the data stored in the same line (Step S106), the memory system control apparatus 200 searches each of the snoop caches and verifies that the status of the line in the snoop cache 231a that corresponds to the processor 110a is "M".

Since the status "M" indicates that the data in the cache memory 110a is the latest, the memory system control apparatus 200 requests the processor 100a to release the line (Step S207).

If the processor 100a releases the line (Step S208), the read-data delivering unit 220 sends the released line to the processor 100b (Step S209).

At this point, the status of the line in the cache memory 100a and the snoop cache 231a changes to "I", while the status of the same line in the cache memory 100b changes to "E" and in the snoop cache 231b the status changes to "W".

Thus, in the memory system control method according to an embodiment of the present invention, issuing of a speculative read request to the main memory can be dispensed with when the status on the snoop cache side is "Strongly modified". Consequently, increase in the transaction between the cache and the main memory can be prevented.

Figure 5:
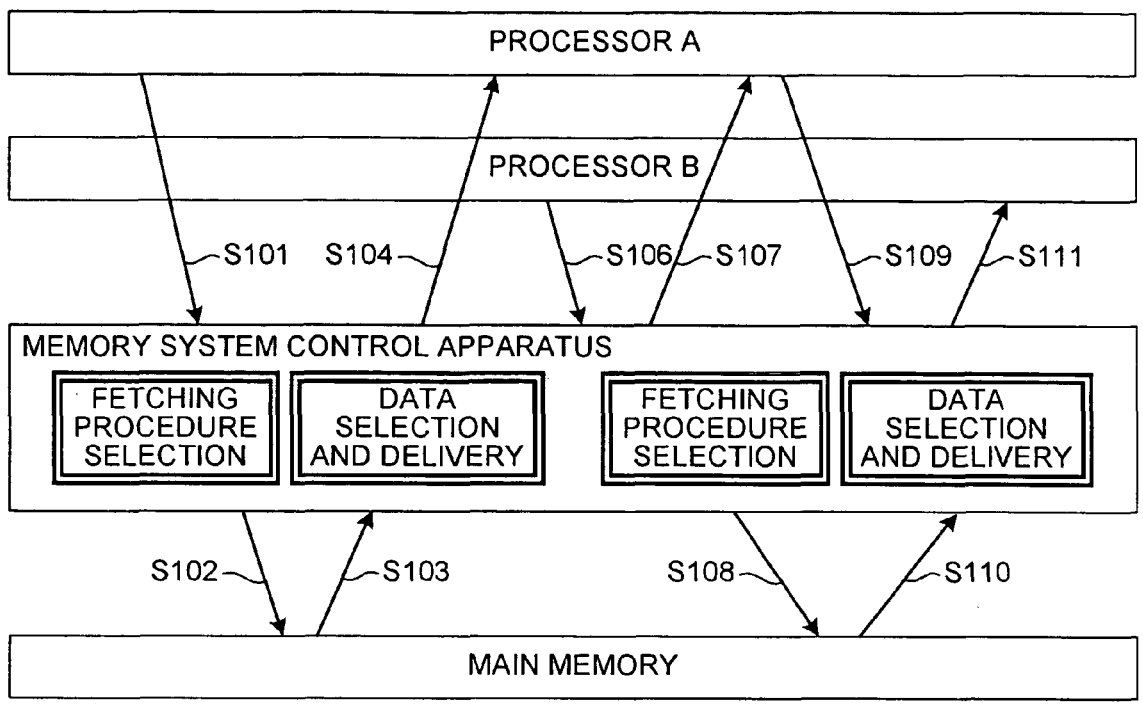
FIG. 5 is a time chart representing the control procedure of the memory system control method according to an embodiment of the present invention when the status is "Weakly modified"
Figure 6:
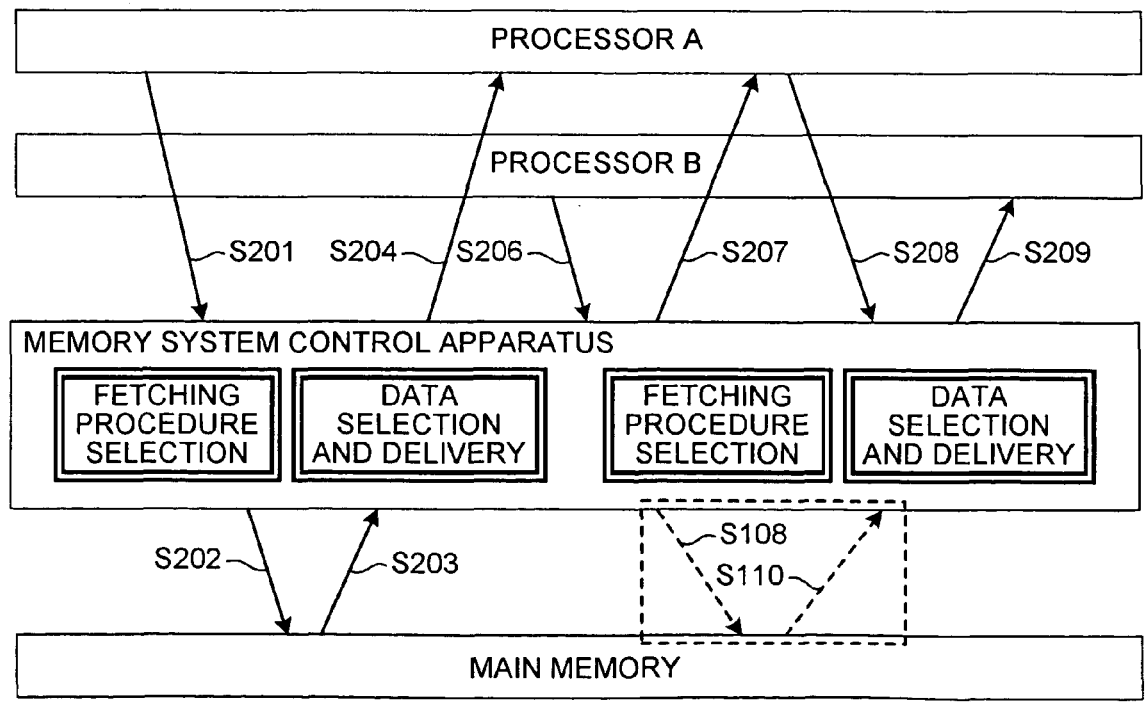
FIG. 6 is a time chart representing the control procedure of the memory system control method according to an embodiment of the present invention when the status is "Strongly modified"

The issue of the speculative read request can be better understood by representing the control procedure using a time chart. FIG. 5 is a time chart representing the control procedure of the memory system control method according to an embodiment of the present invention when the status is "Weakly modified". FIG. 6 is a time chart representing the control procedure of the memory system control method according to an embodiment of the present invention when the status is "Strongly modified".

The difference between FIG. 5 and FIG. 6 is that in FIG. 6, there are no steps corresponding to Steps S108 and S110 of FIG. 5, which correspond to issue of speculative read request to the main memory, and the transaction between the main memory and the cache is reduced by that extent.

Thus, according to an embodiment of the present invention, the "Modified" status of the snoop cache is differentiated into "Weakly modified" and "Strongly modified" according to the type of read request from the processor. By doing so, it is ensured that the data available in the cache memory of the processor in the "Strongly modified" status is the latest. Thus, the occurrence of read request to the main memory is reduced and consequently, the transaction between the main memory and the cache is reduced.

According to the present invention, the "Modified" status of the cache is differentiated into "Weakly modified" and "Strongly modified". By doing so, the cache can controlled more precisely and effectively.

Furthermore, according to the present invention, if a data request is received for data with a prerequisite that the data has already been written, the data is stored with its status set as "Strongly modified". Thus, the status of the data that is stored in the cache memory can be differentiated from the other "Modified" status, and the data can unambiguously be taken as the latest.

Moreover, according to the present invention, the data request is issued only to the cache memory for data that has the status "Strongly modified" in a cache-status maintaining unit and no speculative read request is made to the main memory. Thus the transaction between the cache memory and the main memory can be reduced.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A memory system control apparatus that controls coherency between a cache memory and a main memory, the cache memory being provided for each of a plurality of processors of a multiprocessor system and storing status of a line of the cache memory as any one of statuses including at least "Modified" and "Exclusive", the memory system control apparatus comprising:
    a cache-status maintaining unit that stores address information of data stored in each entry of the cache memory, and maintains a utilization status of each entry as any one of "strongly modified", "weakly modified", "shared", and "Invalid", wherein when the "Modified" is stored as the status of a line of the cache memory, the "strongly modified" or the "weakly modified" is maintained, and when the "Exclusive" is stored as the status of a line of the cache memory, the "weakly modified" is maintained even if the status of a line of the cache memory changes from "Exclusive" to "Modified";
    a data-fetching-procedure selecting unit that selects, upon receiving a data read request from one of the processors, at least one data fetching procedure based on the address information and the utilization status maintained by the cache-status maintaining unit;
    a read-data delivering unit that selects latest data from among the data fetched by the fetching procedure selected by the data-fetching-procedure selecting unit, and delivers the latest data selected to a processor that issued the data read request; and
    a cache-status updating unit that updates, when registering the address information of the data in one of the entries of the cache-status maintaining unit corresponding to the processor that issued the data read request, the utilization status of the entry based on a type of the data read request;
    wherein when receiving the data read request from a first processor, the cache-status updating unit registers the utilization status of the data as "strongly modified" in the cache-status maintaining unit, the data read request being a type that is issued in order to modify the data by the first processor.

2. The memory system control apparatus according to claim 1, wherein when receiving the data read request with a possibility of writing from one of the processors, the cache-status updating unit registers the utilization status of the data as "weakly modified" in the cache-status maintaining unit.

3. The memory system control apparatus according to claim 1, wherein when receiving the data read request with a possibility of a change of the utilization status to "shared" from one of the processors, the cache-status updating unit registers the utilization status of the data as "weakly modified" in the cache-status maintaining unit.

4. The memory system control apparatus according to claim 1, wherein when receiving the data read request with a possibility of a change of the utilization status to "invalid" from one of the processors, the cache-status updating unit registers the utilization status of the data as "weakly modified" in the cache-status maintaining unit.

5. The memory system control apparatus according to claim 1, wherein when the address information of the data requested by one of the processors is present in any of the entries of the cache-status maintaining unit and when the utilization status of the entry that includes the data is "strongly modified", the data-fetching-procedure selecting unit selects a process that involves fetching data only from the processor corresponding to the cache-status maintaining unit as the data fetching procedure.

6. The memory system control apparatus according to claim 1, wherein when the address information of the data requested by one of the processors is present in any of the entries of the cache-status maintaining unit and when the utilization status of the entry that includes the data is "weakly modified", the data-fetching-procedure selecting unit selects a process that involves fetching the data from the processor corresponding to the cache-status maintaining unit and fetching the data from the main memory as the data fetching procedure.

7. The memory system control apparatus according to claim 1, wherein when the address information of the data requested by one of the processors is present in any of the entries of the cache-status maintaining unit and when the utilization status of the entry that includes the data is "shared", the data-fetching-procedure selecting unit selects a process that involves fetching data from the processor corresponding to the cache-status maintaining unit as the data fetching procedure.

8. The memory system control apparatus according to claim 1, wherein when the address information of the data requested by one of the processors is present in any of the entries of the cache-status maintaining unit and when the utilization status of the entry that includes the data is "invalid", the data-fetching-procedure selecting unit selects a process that involves fetching data only from the main memory as the data fetching procedure.

9. The memory system control apparatus according to claim 1, wherein when the address information of the data requested by one of the processors is not present in any of the entries of the cache-status maintaining unit, the data-fetching-procedure selecting unit selects a process that involves fetching data only from the main memory as the data fetching procedure.

10. A memory system control method for controlling coherency between a cache memory and a main memory, the cache memory being provided for each of a plurality of processors of a multiprocessor system and storing status of a line of the cache memory as any one of statuses including at least "Modified" and "Exclusive", the memory system control method comprising:

a cache-status maintaining step of storing address information of data stored in each entry of the cache memory, and maintaining a utilization status of each entry as any one of "strongly modified", "weakly modified", "shared", and "Invalid", wherein when the "Modified" is stored as the status of a line of the cache memory, the "strongly modified" or the "weakly modified" is maintained, and when the "Exclusive" is stored as the status of a line of the cache memory, the "weakly modified" is maintained even if the status of a line of the cache memory changes from "Exclusive" to "Modified";

a data-fetching-procedure selecting step of selecting, upon receiving a data read request from one of the processors, at least one data fetching procedure based on the address information and the utilization status maintained at the cache-status maintaining step;

a read-data delivering step of selecting latest data from among the data fetched by the fetching procedure selected at the data-fetching-procedure selecting step, and delivering the latest data selected to a processor that issued the data read request; and a cache-status updating step of updating, when registering the address information of the data in one of the entries in the cache-status maintaining step corresponding to the processor that issued the data read request, the utilization status of the entry based on a type of the data read request;

wherein when receiving the data read request from a first processor, the cache-status updating step includes registering the utilization status maintained in the cache-status maintaining step as "strongly modified", the data read request being a type that is issued in order to modify the data by the first processor.

11. The memory system control method according to claim 10, wherein when receiving the data read request with a possibility of writing from one of the processors, the cache-status updating step includes registering the utilization status maintained in the cache-status maintaining step as "weakly modified".

12. The memory system control method according to claim 10, wherein when receiving the data read request with a possibility of a change of the utilization status to "shared" from one of the processors, the cache-status updating step includes registering the utilization status maintained in the cache-status maintaining step as "weakly modified".

13. The memory system control method according to claim 10, wherein when receiving the data read request with a possibility of a change of the utilization status to "invalid" from one of the processors, the cache-status updating step includes registering the utilization status maintained in the cache-status maintaining step as "weakly modified".

14. The memory system control method according to claim 10, wherein when the address information of the data requested by one of the processors is present in any of the entries in the cache-status maintaining step and when the utilization status of the entry that includes the data is "strongly modified", the data-fetching-procedure selecting step includes selecting a process that involves fetching data only from the processor corresponding to the entry whose utilization status is "strongly modified" as the data fetching procedure.

15. The memory system control method according to claim 10, wherein when the address information of the data requested by one of the processors is present in any of the entries in the cache-status maintaining step and when the utilization status of the entry that includes the data is "weakly modified", the data-fetching-procedure selecting step includes selecting a process that involves fetching the data from the processor corresponding to the entry whose utilization status is "weakly modified" and fetching the data from the main memory as the data fetching procedure.

16. The memory system control method according to claim 10, wherein when the address information of the data requested by one of the processors is present in any of the entries in the cache-status maintaining step and when the utilization status of the entry that includes the data is "shared", the data-fetching-procedure selecting step includes selecting a process that involves fetching data from the processor corresponding to the entry whose utilization status is "shared" as the data fetching procedure.

17. The memory system control method according to claim 10, wherein when the address information of the data requested by one of the processors is present in any of the entries in the cache-status maintaining step and when the utilization status of the entry that includes the data is "invalid", the data-fetching-procedure selecting step includes selecting a process that involves fetching data only from the main memory as the data fetching procedure.

18. The memory system control method according to claim 10, wherein when the address information of the data requested by one of the processors is not present in any of the entries in the cache-status maintaining step, the data-fetching-procedure selecting step includes selecting a process that involves fetching data only from the main memory as the data fetching procedure.

* * * * *